(12) United States Patent
Hirose et al.

(10) Patent No.: US 8,162,410 B2
(45) Date of Patent: Apr. 24, 2012

(54) ENDLESS ELONGATED MEMBER FOR CRAWLER AND CRAWLER UNIT

(75) Inventors: Shigeo Hirose, Shinagawa-ku (JP); Shingo Tsukui, Toyohashi (JP)

(73) Assignees: Tokyo Institute of Technology, Tokyo (JP); Topy Kogyo Kabushiki Kaisha, Tokyo (JP)

( * ) Notice: Subject to any disclaimer, the term of this patent is extended or adjusted under 35 U.S.C. 154(b) by 943 days.

(21) Appl. No.: 11/793,445

(22) PCT Filed: Dec. 19, 2005

(86) PCT No.: PCT/JP2005/023245
§ 371 (c)(1),
(2), (4) Date: Jul. 23, 2008

(87) PCT Pub. No.: WO2006/068080
PCT Pub. Date: Jun. 29, 2006

(65) Prior Publication Data
US 2008/0284244 A1 Nov. 20, 2008

(30) Foreign Application Priority Data
Dec. 20, 2004 (JP) .................................. 2004-367232

(51) Int. Cl.
*B62D 55/24* (2006.01)
(52) U.S. Cl. .................. 305/165; 305/166; 305/178
(58) Field of Classification Search .................. 305/157, 305/165, 166, 178; 180/8.1, 8.2, 9.1, 9.32
See application file for complete search history.

(56) References Cited

U.S. PATENT DOCUMENTS

| | | | |
|---|---|---|---|
| 2,312,072 A * | 2/1943 | Tenger | 305/161 |
| 5,632,537 A | 5/1997 | Yoshimura et al. | |
| 6,722,746 B2 * | 4/2004 | Katayama et al. | 305/179 |
| 6,974,196 B2 * | 12/2005 | Gagne et al. | 305/166 |
| 7,018,005 B2 * | 3/2006 | Lemieux | 305/178 |

FOREIGN PATENT DOCUMENTS

| | | |
|---|---|---|
| GB | 2288580 | 10/1995 |
| JP | 60-110566 | 6/1985 |
| JP | 62-71709 | 4/1987 |
| JP | 63-024863 | 5/1988 |
| JP | 63192676 A * | 8/1988 |
| JP | 04-078482 | 12/1992 |

(Continued)

OTHER PUBLICATIONS

European Search Report for European Application No. 05816945.9, dated Apr. 3, 2009 (6 pages).

(Continued)

*Primary Examiner* — Kip T Kotter
(74) *Attorney, Agent, or Firm* — Osha • Liang LLP (57) ABSTRACT

A crawler belt 20 includes first regions and second regions alternately arranged in a circumferential direction thereof. The first region has at least one first tread lug 25 and the second region has at least one second tread lug 26. The first tread lug 25 has high flexural rigidity and is not easily bent and the second tread lug 26 has low flexural rigidity and is easily bent. The first tread lug 25 catches on an upper end of a high step or bump S with the second tread lug 26 in a bent condition, thus allowing the crawler unit to move over the step or bump.

5 Claims, 10 Drawing Sheets

FOREIGN PATENT DOCUMENTS

| JP | 4-078482 B2 | 12/1992 |
|----|-------------|---------|
| JP | 6-156333 | 6/1994 |
| JP | 6-199253 | 7/1994 |
| JP | 6-329057 | 11/1994 |
| JP | 07-052841 | 2/1995 |
| JP | 07-117738 | 5/1995 |
| JP | 08-142940 | 6/1996 |
| JP | 2002-211455 | 7/2002 |
| JP | 2002-337766 | 11/2002 |
| JP | 2003-335272 | 11/2003 |

OTHER PUBLICATIONS

Mechanical English translation of Japanese patent Application 2002-337766, filed May 16, 2001 (24 pages).

Patent Abstracts of Japan Publication No. 2002-337766, Published Nov. 27, 2002 (1 page).

Office Action in Chinese Patent Application No. 2005800437991, mailed Jun. 13, 2008, 5 pages.

Patent Abstracts of Japan, Publication No. 2002-211455, dated Jul. 31, 2002, 25 pages.

Office Action dated Feb. 20, 2007 issued by the Japan Patent Office (2 pages).

International Search Report w/ English Translation for PCT/JP2005/023245 mailed on Mar. 14, 2006 (3 pages).

Patent Abstracts of Japan 2003-335272 dated Nov. 25, 2003 (2 pages).

Patent Abstracts of Japan 06-156333 dated Jun. 3, 1994 (2 pages).

Patent Abstracts of Japan 06-199253 dated Jul. 19, 1994 (2 pages).

Patent Abstracts of Japan 06-329057 dated Nov. 29, 1994 (2 pages).

* cited by examiner

ENDLESS ELONGATED MEMBER FOR CRAWLER AND CRAWLER UNIT

TECHNICAL FIELD

This invention relates to an endless elongated member for crawler and a crawler unit used in an underbody of a lightweight robot, etc.

BACKGROUND ART

Crawler belts made of rubber for a crawler unit have been developed. As disclosed in patent documents 1 to 3 listed below, the crawler belts have a multitude of tread lugs arranged at intervals on outer peripheries thereof. The tread lugs catch on steps or bumps on the ground, thereby allowing the crawler unit to move over the steps or bumps.

Patent Document 1: Japanese Patent Application Laid-Open No. H6-156333
Patent Document 2: Japanese Patent Application Laid-Open No. H6-199253
Patent Document 3: Japanese Patent Application Laid-Open No. H6-329057

DISCLOSURE OF THE INVENTION

Problem to be Solved by the Invention

However, the tread lugs of the crawler belts disclosed in the Patent Documents 1 to 3 are of the same shape and have high flexural rigidity. This limits height of steps that the crawler unit can move over. To be more specific, a tread lug that reaches a step first is abutted against a riser of the step, prohibiting the crawler unit from moving further toward the step. Accordingly, the next tread lug cannot catch on an upper end of the step when the step is high. If a distance between the tread lugs were wide enough, the next tread lug could catch on the upper end of the high step after the tread lug that reached the step first has moved downward and been away from the step. However, widening the distances between the tread lugs may compromise the stability of running.

Means for Solving the Problem

The present invention has been made in order to solve the above mentioned problem. According to the present invention, there is provided an endless elongated member for a crawler comprising a multitude of tread lugs arranged at intervals in a circumferential direction thereof, the multitude of tread lugs including at least two kinds of tread lugs, first tread lugs and second tread lugs, the first tread lugs having high flexural rigidity and being not easily bent, the second treads lug having low flexural rigidity and being easily bent.

In such an arrangement, when a crawler unit hits a step or a bump, the second tread lug is elastically deformed to be bent. Accordingly, the first tread lug can be brought near the step and catch on an upper end of the step even when the height of the step is greater than a radius from a center of a wheel to a top end of the tread lug. As a result, the crawler unit can move over the high step.

Preferably, all of the tread lugs including the first and the second tread lugs are of the same height. This allows the crawler unit to move stably on flat ground.

Preferably, the endless elongated member includes first regions and second regions alternately arranged in the circumferential direction thereof, each of the first regions having at least one the first tread lug, each of the second regions having at least one the second tread lug. This allows the crawler unit to move over the high step more certainly.

Preferably, a height of the second tread lug is not less than 3 times and not greater than 7 times as large as its thickness. This allows the second tread lug to be easily deformed while securing its load bearing capacity. This also provides the second tread lug with excellent gripping ability for rubbles, etc., thus enabling the crawler unit to move without sliding.

Preferably, the first and the second tread lugs extend in a width direction of the endless elongated member and have trapezoidal longitudinal sections, a bottom end of the second tread lug being much thinner than that of the first tread lug. In such an arrangement, the trapezoidal longitudinal sections provide draft angles for molding the tread lugs.

Preferably, the second tread lug has a bent planar shape. This enhances the load bearing capacity of the second tread lug.

According to the present invention, there is also provided a crawler unit comprising a plurality of wheels arranged in a front and rear direction and an endless elongated member trained around the wheels, the endless elongated member including a multitude of tread lugs of the same height arranged at intervals in a circumferential direction thereof, the endless elongated member having first regions and second regions alternately arranged in the circumferential direction thereof, the multitude of tread lugs including at least two kinds of tread lugs, first tread lugs and second treads lug, each of the first regions having at least one the first tread lug, each of the second regions having at least one the second tread lug, the first tread lug having high flexural rigidity and being not easily bent, the second tread lug having low flexural rigidity and being easily bent.

In such an arrangement, when the crawler unit hits a step or a bump, the second tread lug is elastically deformed to be bent. Accordingly, the first tread lug can be brought near the step and catch on an upper end of the step even when the height of the step is greater than a radius from a center of the wheel to a top end of the tread lug. As a result, the crawler unit can move over the high step.

Effect of the Invention

According to the present invention, a crawler unit can move over a high step or bump.

DESCRIPTION OF REFERENCE NUMERALS

| | |
|---|---|
| 2L, 2R | crawler unit |
| 10 | wheel |
| 20 | crawler belt (endless elongated member) |
| 25 | first tread lug |
| 26 | second tread lug |
| R1 | first region |
| R2 | second region |

BEST MODE FOR CARRYING OUT THE INVENTION

Figure 1:
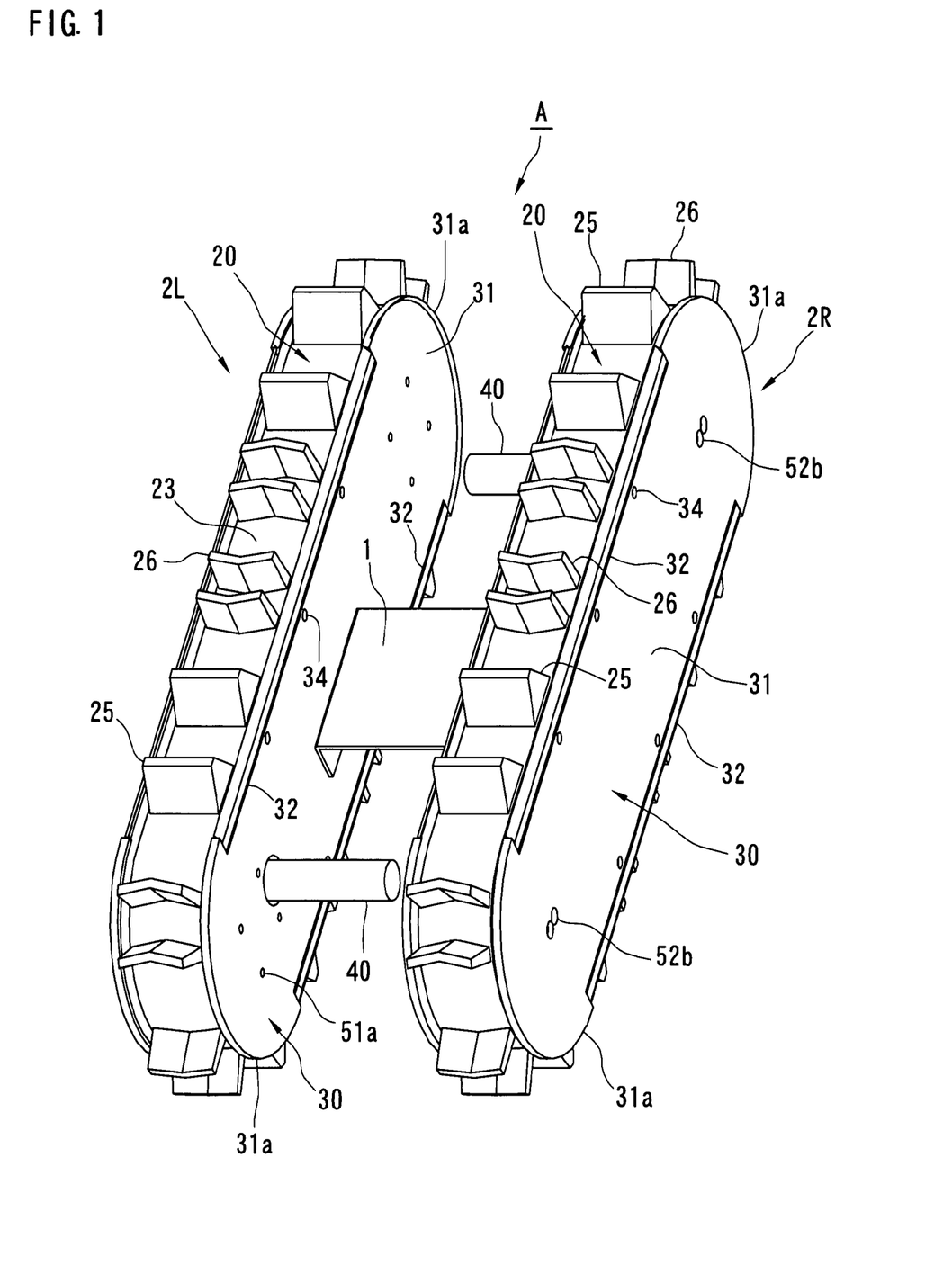
FIG. 1 is a perspective view of an underbody of a robot having a pair of left and right crawler units according to a first embodiment of the present invention.

One embodiment of the present invention is described below referring to the drawings. FIG. 1 shows an underbody A of a light-duty robot. The underbody A comprises a mounting base 1 and a pair of crawler units 2L, 2R attached on left and right portions of the mounting base 1. An upper body of the robot is mounted on the mounting base 1. The upper body may be of various constructions according to the role of the robot. For example, a robot for searching people trapped under the rubble at the time of disasters such as an earthquake has a camera, a detection sensor and an illuminating device, and a grasping mechanism for grasping light-weight items, according to necessity.

Figure 2:
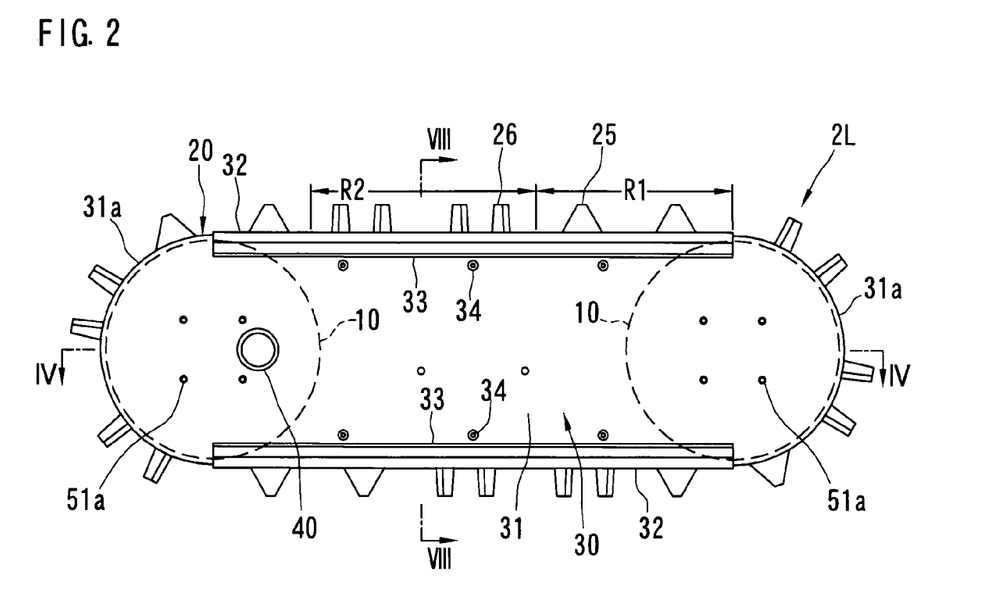
FIG. 2 is a right side view of the crawler unit in the left.
Figure 3:
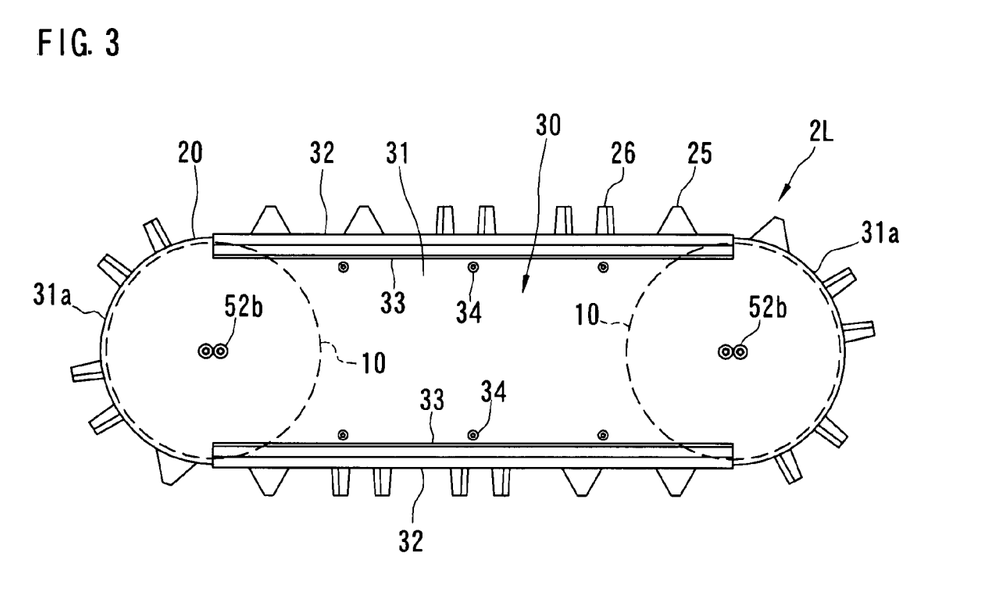
FIG. 3 is a left side view of the crawler unit in the left.

As shown in FIGS. 1 through 3, each of the crawler units 2L, 2R comprises front and rear wheels 10, an endless crawler belt 20 (endless elongated-member for a crawler) trained around the wheels 10 and a pair of side plates 30. A central portion of an inner one of the side plates 30 of each of the pair of the crawler units 2L, 2R is attached to the mounting base 1.

The left and right crawler units 2L, 2R are substantially of the same construction. However, in the left crawler unit 2L, the rear wheel 10 is connected to an actuator 40 and serves as a driven wheel and the front wheel 10 serves as a non-driven wheel. On the other hand, in the right crawler unit 2R, the front wheel 10 is connected to the actuator 40 and serves as a driven wheel and the rear wheel 10 serves as a non-driven wheel.

Figure 4:
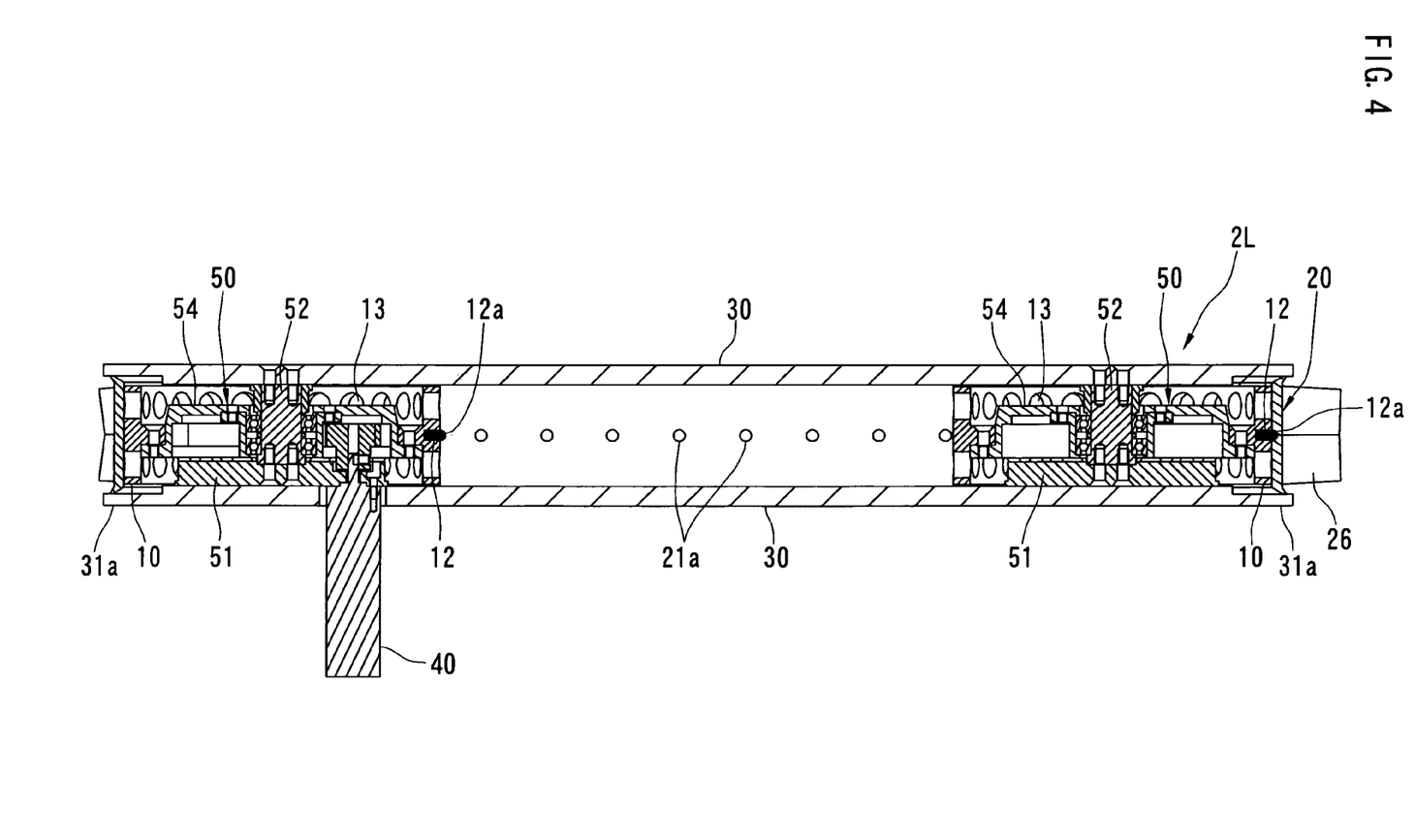
FIG. 4 is a cross-sectional view of the crawler unit of FIG. 2 taken along line IV-IV.
Figure 6:
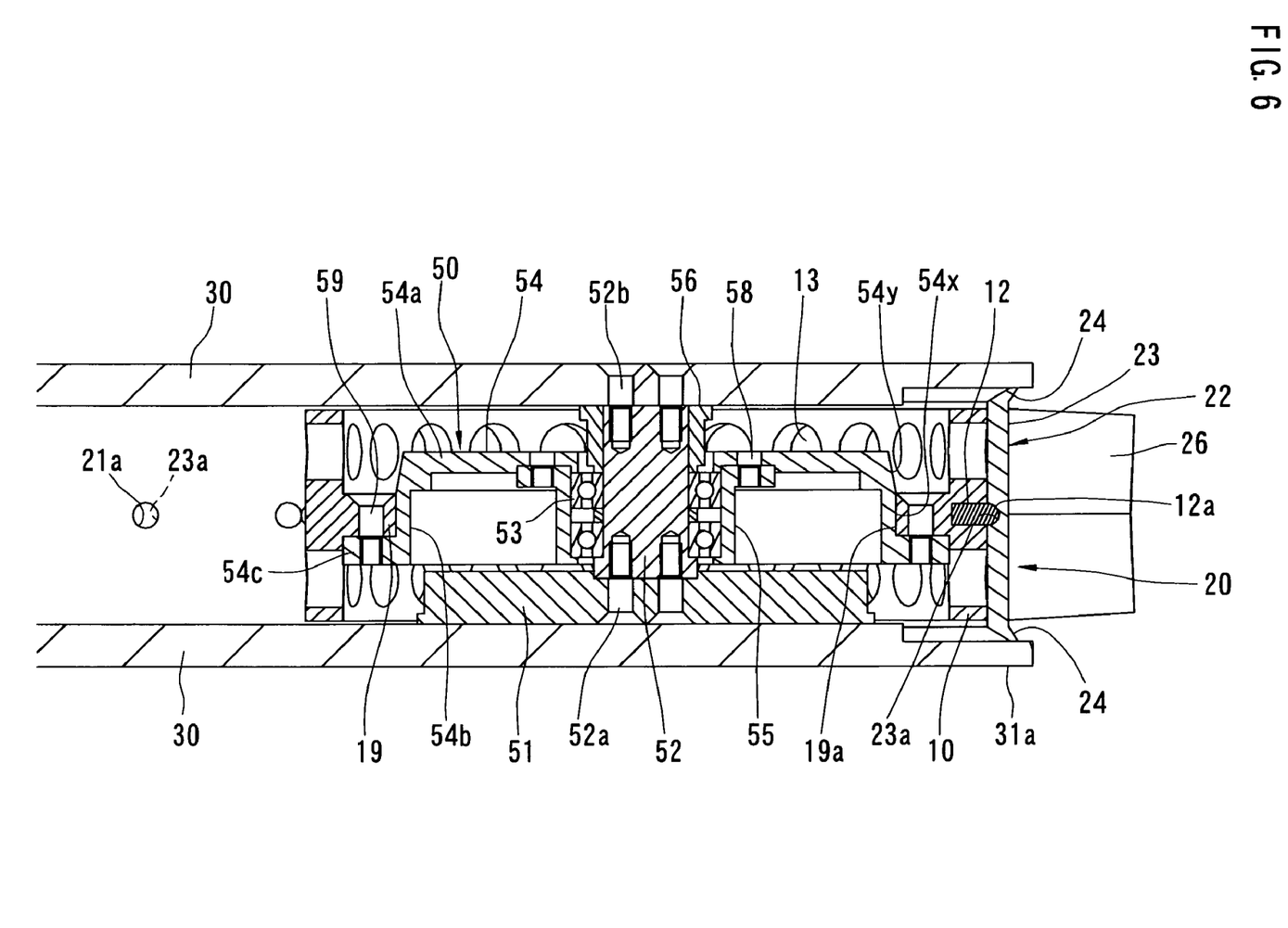
FIG. 6 is an enlarged cross-sectional view of a front end portion of the crawler unit of FIG. 4.
Figure 7:
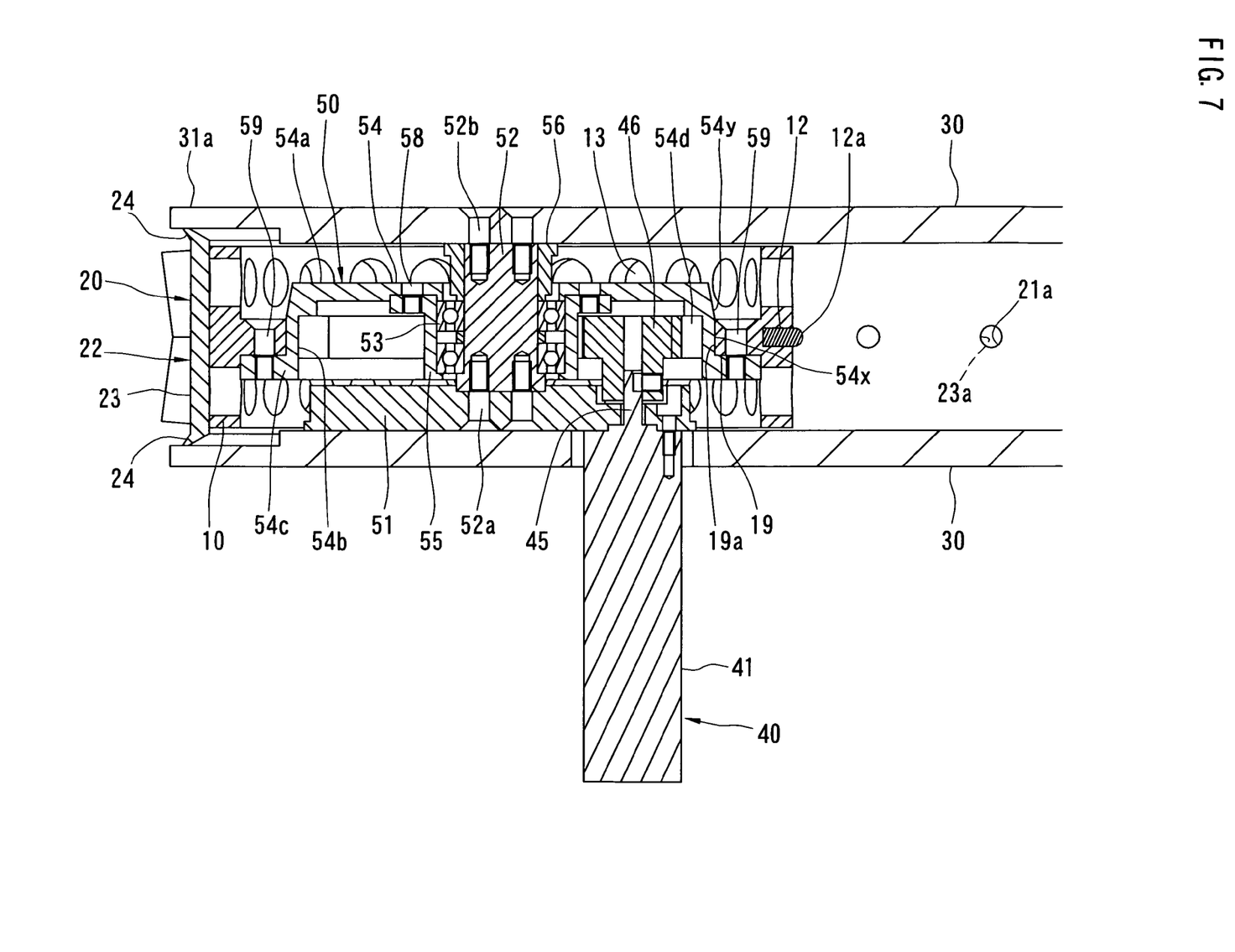
FIG. 7 is an enlarged cross-sectional view of a rear end portion of the crawler unit of FIG. 4.

The left crawler unit 2L is described more in detail below. Each of the wheels 10 is made of resin, and as shown in FIGS. 4, 6 and 7, has a multitude of perforation holes 13 to reduce its weight. An outer peripheral surface of the wheel 10 is a cylindrical surface. Engagement pins 12 made of metal are embedded in the outer peripheral surface of the wheel 10. The engagement pins 12 are arranged at even intervals in a circumferential direction at a center in a width direction of the outer peripheral surface of the wheel 10. Head parts of the engagement pins 12 have hemispherical shapes and project from the outer peripheral surface of the wheel 10. The head parts are provided as engagement projections 12a. In this embodiment, a diameter of the engagement projection 12a is about 3 millimeters while a width of the wheel 10 is 30 millimeters.

As shown in FIGS. 1 through 3, the pair of side plates 30 are disposed to the left and right of the pair of wheels 10. Each of the side plates 30 comprises a metal plate 31 in a shape of an oblong plate elongated in a front and rear direction and upper and lower seal members 32. Front and rear end portions of the pair of metal plates 31 cover opposite side surfaces of the pair of wheels 10.

The metal plate 31 of the side plate 30 comprises front and rear end edge portions 31a of semi-circular shapes respectively curved along peripheral edges of the front and rear wheels 10. The front and rear end edge portions 31a are, as shown in FIGS. 4, 6 and 7, cut away from inside to be reduced in thickness.

Figure 8:
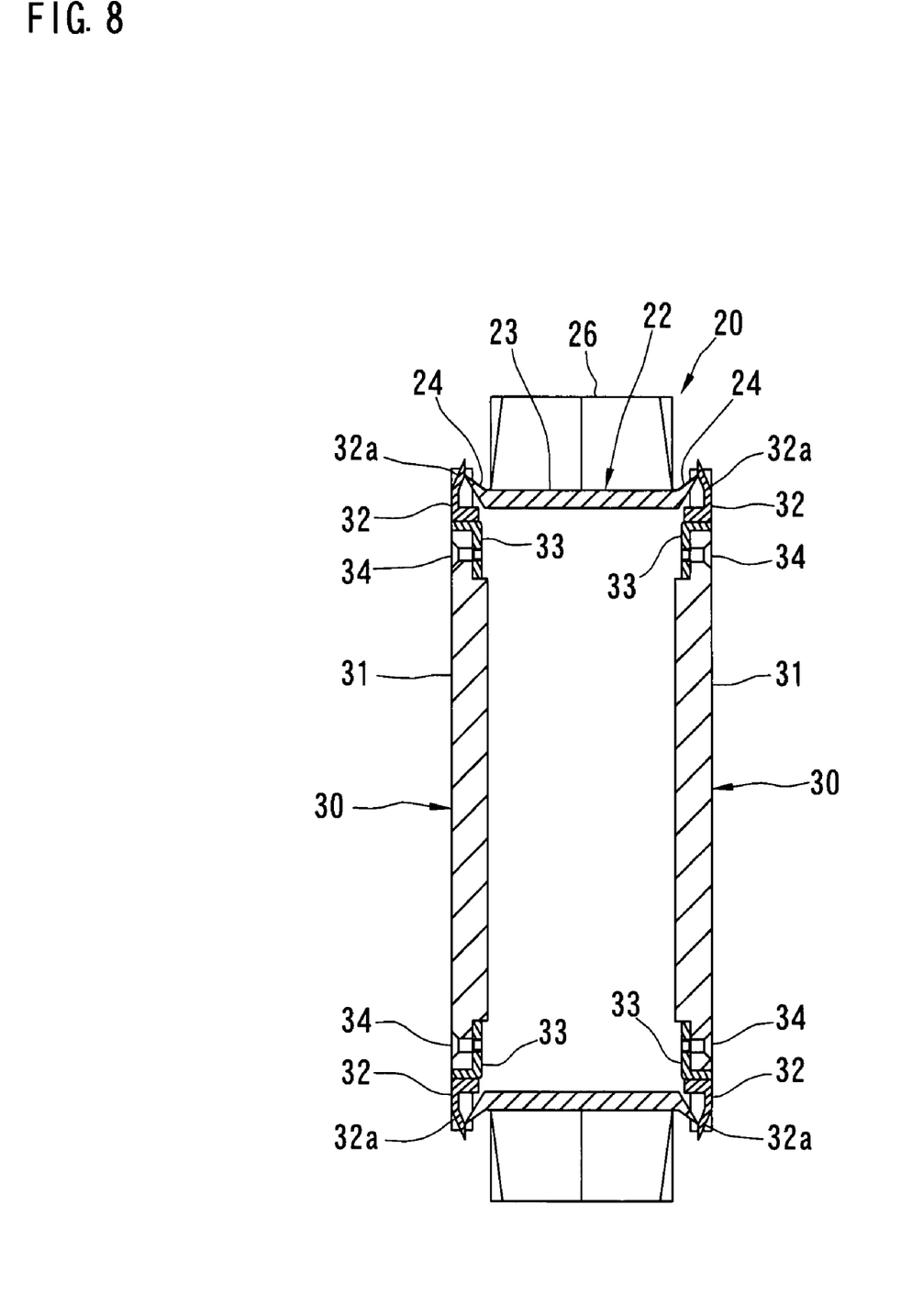
FIG. 8 is a cross-sectional view of the crawler unit of FIG. 2 taken along line VIII-VIII.

The seal members 32 are detachably attached to upper and lower linear edge portions continuing to the end edge portions 31a of the metal plate 31. To be more specific, the seal member 32 is made of a rubber material having a smaller elastic coefficient than a belt main body 22 of the crawler belt 20 to be described later. As clearly illustrated in FIG. 8, the seal member 32 is attached to a linear bracket 33 having a L-shaped cross-section by vulcanization bonding, etc. and the bracket 33 is removably secured to the upper and lower edge portions of the metal plate 31 with screws 34. The seal member 32 includes a thin raised wall 32a.

Figure 9:
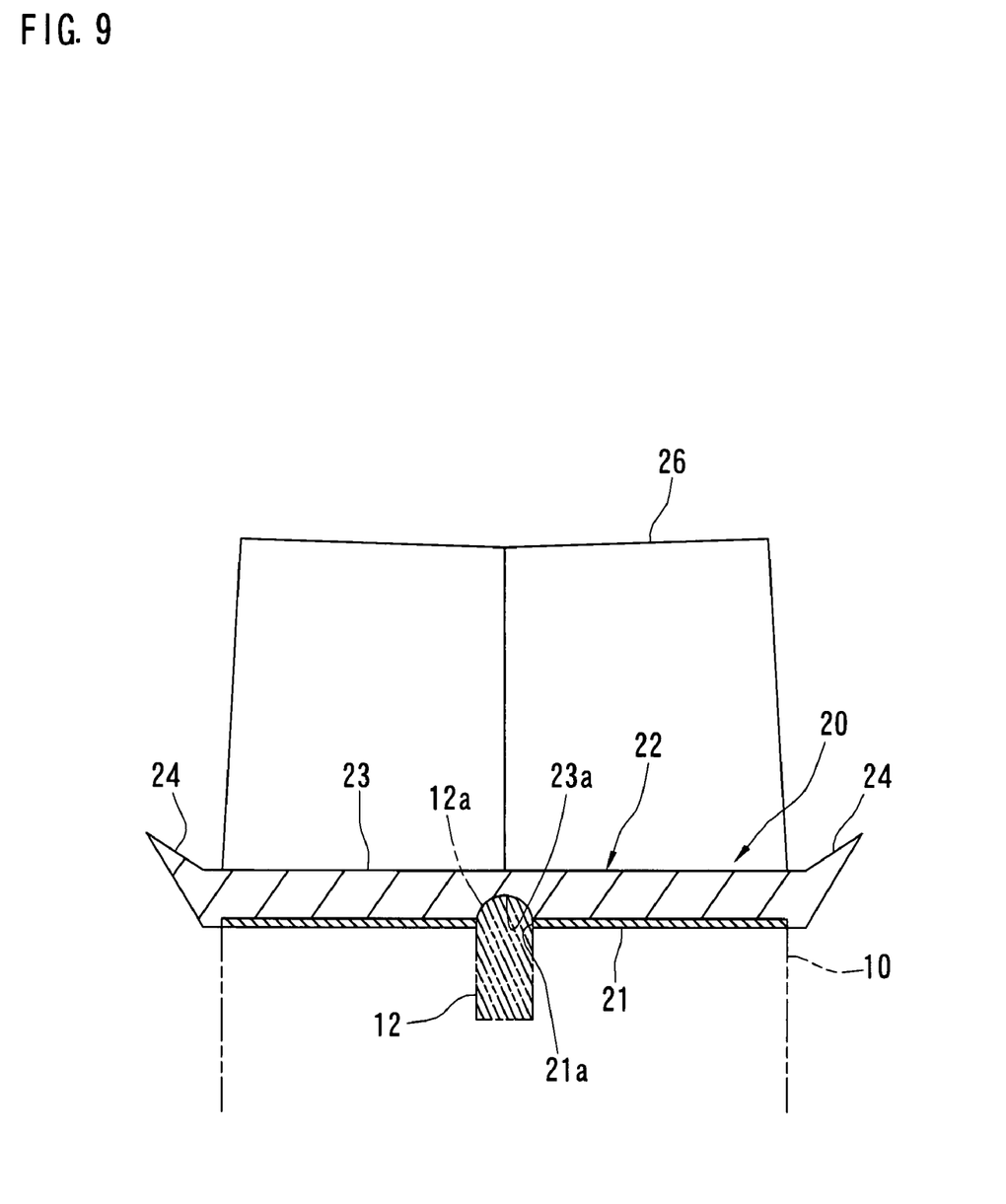
FIG. 9 is an enlarged cross-sectional view of a crawler belt with a thickness of a steel belt being exaggerated.

As shown in FIG. 9, the crawler belt 20 includes an endless steel belt 21 made of stainless steel (thin metal belt, high-tensile-strength belt) and the belt main body 22. The belt main body 22 is endless, made of rubber (elastic material) such as SBR and urethane rubber and attached around an entire outer periphery of the steel belt 21 by vulcanization bonding, etc.

The steel belt 21 is constructed by welding opposite ends of an elongated thin belt of a thickness of from 0.05 to 1.0 millimeters (0.15 millimeters in this embodiment). A width of the steel belt 21 is generally the same as that of the wheel 10. The steel belt 21 has circular engagement holes 21a arranged at even intervals (the same intervals as those of the engagement projections 12a of the wheel 10) in a circumferential direction at a center in the width direction thereof. A diameter of the engagement hole 21a is the same as or a slightly greater than that of the engagement projection 12a.

The steel belt 21 according to this embodiment is extremely thin compared with a base part 23 (of a thickness of 3 millimeters) to be described later. The thickness of the steel belt 21 is exaggerated in FIG. 9 and the steel belt 21 is omitted in other drawings.

As shown in FIGS. 1 and 9, the belt main body 22 integrally includes the base part 23 that is endless and of a width greater than that of the steel belt 21, a shielding flange 24 formed on opposite sides in a width direction of the base part 23 and two kinds of tread lugs 25, 26 formed at intervals on an outer periphery of the base part 23. The base part 23 has generally semi-spherical escape recesses 23a arranged at center in the width direction thereof, at locations corresponding to the engagement holes 21a of the steel belt 21 to communicate with the engagement holes 21a.

As shown in FIGS. 2 to 4, the crawler belt 20 is placed around half of the periphery of the wheels 10 in the front and rear. As shown in FIG. 9, in an area covering half of the periphery of the wheel 10, the steel belt 21 directly contacts the outer peripheral surface of the wheel 10, with the engagement projections 12a of the wheel 10 engaging the engagement holes 21a of the steel belt 21 and entering the escape recesses 23a of the base part 23.

The shielding flange 24 is formed continuously around the entire periphery of the belt main body 22. The shielding flange 24 projects in an oblique direction from an outer peripheral surface of the base part 23. The shielding flange 24 has a tapered cross section, thereby being allowed to be easily elastically deformed.

As shown in FIG. 2, the crawler belt 20 includes first regions R1 and second regions R2 alternately arranged in a circumferential direction. Two first tread lugs 25 are disposed in the first region R1 and four second tread lugs 26 are disposed in the second region R2.

The first tread lug 25 extends in a width direction of the crawler belt 20 and has a trapezoidal longitudinal section. In this embodiment, a thickness of the first tread lug 25 is 15 millimeters at the bottom and 4 millimeters at the top while its height is 15 millimeters. The first tread lug 25 is thick at the bottom, and therefore has enough flexural rigidity to remain unbent when a force orthogonal to a width direction of the crawler belt (i.e. circumferential direction) is applied to the first tread lug 25.

The second tread lug 26 extends in the width direction of the crawler belt 20 and has a trapezoidal longitudinal section. In this embodiment, a thickness of the second tread lug 26 is 5 millimeters at the bottom and 3 millimeters at the top while its height is 15 millimeters. The thickness of the second tread lug 26 is very small compared to its height, and therefore, flexural rigidity of the second tread lug 26 is much smaller than that of the first thread lug 25. Accordingly, the second tread lug 26 bends easily when a force orthogonal to a width direction of the crawler belt (i.e. circumferential direction) is applied to the second tread lug 26. Preferably, the height of the tread lug 26 is not less than 3 times and not greater than 7 times as large as its thickness (an average thickness or a thickness at center in a height direction). More preferably, the height of the tread lug 26 is not less than 3.5 times and not greater than 5 times as large as its thickness. The tread lug 26 has a planar shape bent at a center thereof as shown in FIG. 1. The bent configuration strengthens the tread lug 26 against load in height direction, i.e. self-weight of the robot.

As shown in FIGS. 4, 6 and 7, the wheels 10 in the front and rear are rotatably supported by the pair of side plates 30 via support mechanisms 50 in the front and rear, respectively. The support mechanism 50 comprises a disk-shaped attachment base 51, a shaft member 52, a bearing 53 and a rotating member 54.

The attachment base 51 is secured to one of the side plates 30 (located in an inner side) by screws 51a (shown only in FIGS. 1 and 2). One end of the shaft member 52 is secured to the attachment base 51 by screws 52a and the other end of the shaft 52 is secured to the other of the side plates 30 (located in an outer side) by screws 52b.

The bearing 53 is received in a bearing housing 55 and fits around an outer periphery of the shaft member 52. The bearing 53 is supported by a step formed around the shaft member 52 and a bearing stopper 56 secured to the shaft member 52.

The rotating member 54 includes a disk part 54a, a tubular part 54b continuous from an outer peripheral edge of the disk part 54a and a circular flange part 54c extending radially outwardly from a peripheral edge (peripheral edge in the opposite side from the disk part 54a) of the tubular part 54b. A hole is formed at a center of the disk part 54a for receiving the shaft member 52 therethrough. A peripheral edge portion of the hole is secured to a flange part of the bearing housing 55 by screws 58.

On the other hand, a circular flange part 19 extending radially inwardly is formed in a central portion in a width direction of an inner periphery of the wheel 10. The flange part 19 is secured to the flange part 54c of the rotating member 54 by screws 59. This allows the wheel 10 to be rotatably supported by the shaft member 52 via the rotating member 54 and the bearing 53.

The front and rear support mechanisms 50 are of the same construction. However, as shown in FIG. 7, a connecting structure to the actuator 40 is added to the rear support mechanism 50. To be more specific, a casing 41 of the actuator 40 (including an electrical motor and a speed reduction mechanism) passes through the inner side plate 30 and secured to the attachment base 51 by screws and an output shaft 45 of the actuator 40 passes through the attachment base 51. A spur gear 46 is secured to the output shaft 45. On the other hand, a teeth portion 54d is formed in an inner periphery of the tubular part 54b of the rotating member 54. Meshing of the teeth portion 54d with the spur gear 46 transmits rotary torque from the actuator 40 to the rear wheel 10.

The tubular part 54b of the rotating member 54 includes a fitting portion 54x and a guide portion 54y adjacent to each other. The fitting portion 54x is located on a flange part 54c side. The fitting portion 54x has a cylindrical outer peripheral surface and a diameter same as that of a fitting hole 19a defined by an inner peripheral surface of the flange part 19 so that the fitting portion 54x can fit into the fitting hole 19a. The guide portion 54y is located on a disk part 54a side and has a circular conical outer peripheral surface, i.e. tapered outer peripheral surface.

The fitting portion 54x and the guide portion 54y are useful when assembling the crawler unit 2L. Steps to assemble the crawler unit 2L will now be described with reference to FIG. 5. The front support mechanism 50 and the rear support mechanism 50 with the actuator 40 are assembled first and the support mechanisms 50 are secured to one of the side plates (inner side plate) 30 to form a first assembly 101.

Figure 5:
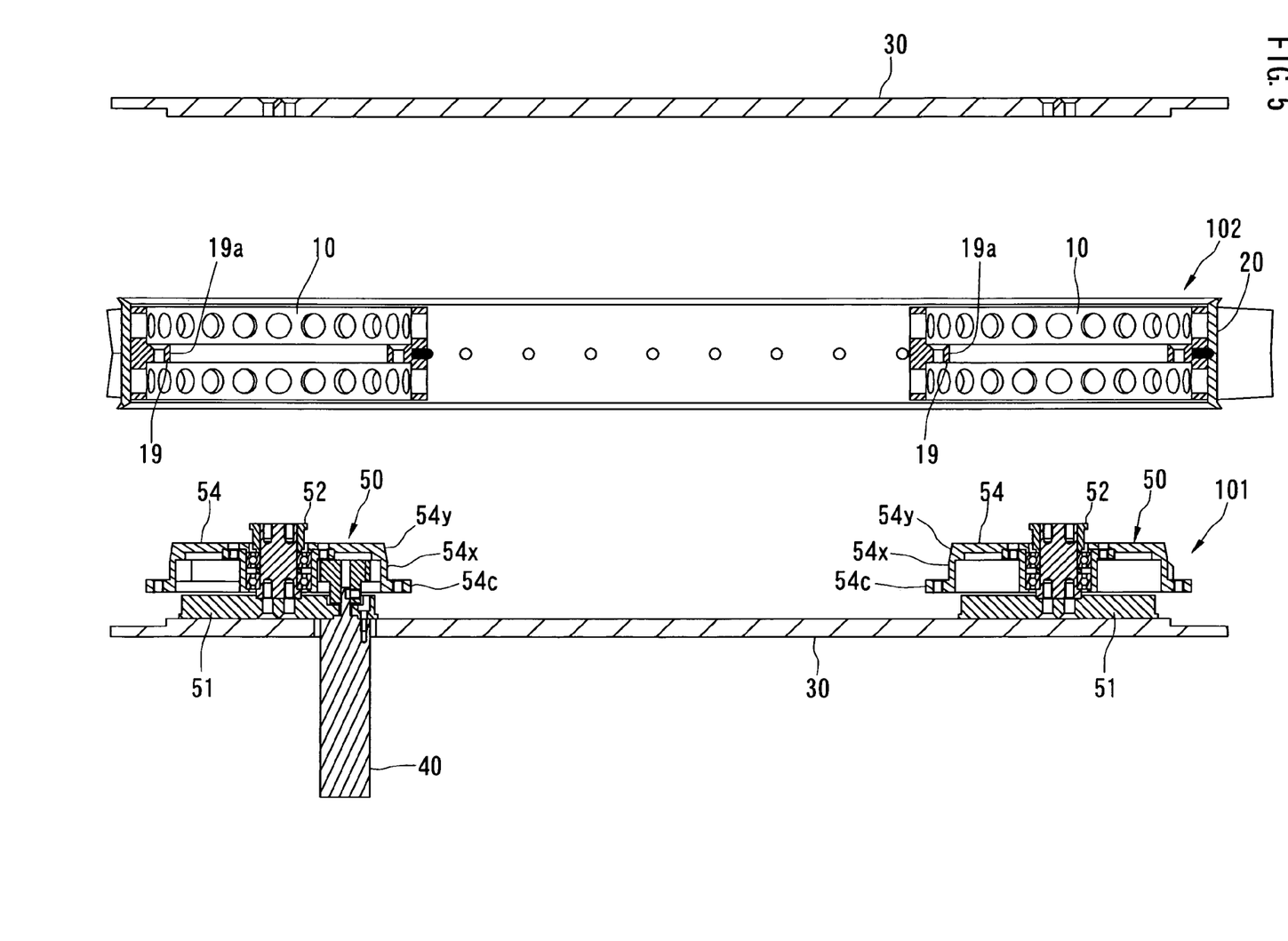
FIG. 5 is an exploded sectional view of the crawler unit of FIG. 4.

On the other hand, the crawler belt 20 is trained around the front and rear wheels 10 to form a second assembly 102.

Next, the rotating members 54 of the front and rear support mechanisms 50 of the first assembly 101 are fitted into the front and rear wheels 10 of the second assembly 102. At this time, a distance between the front and rear wheels 10 are slightly increased by guiding action of the guide portions 54y of the rotating members 54, in other words tensile force is applied to the crawler belt 20, while the fitting portions 54x are being fitted into the fitting holes 19a of the wheels 10. This allows the wheels 10 to be precisely set in position. After that, the flange parts 19 of the wheels 10 are secured to the flange parts 54c of the rotating members 54 by screws. Then the other side plate 30 is secured to the shaft members 52 of the support mechanisms 50, 50.

The crawler 2R on the right side is assembled in the same manner as the crawler 2L on the left side. As mentioned above, the action of the guide portions 54y and the fitting portions 54x enables the efficient and precise assembly of the crawler units 2L, 2R. Forming the wheel 10 with resin may further facilitate smooth fitting and securing of the rotating member 54 into the wheel 10.

In a robot of the above described construction, when the actuators 40 of the crawler units 2L, 2R in the left and right are driven, rotary torque is applied to the rear wheel 10 of the left crawler unit 2L and the front wheel 10 of the right crawler unit 2R. As a result, the crawler belt 20 is rotated, thereby causing the robot to move.

Although the belt main body 22 used in the crawler belt 20 is made of rubber, since it is reinforced with the steel belt 21, it is not stretched even after long use and can be prevented from coming off the wheel 10. Moreover, the crawler belt 20 can be greatly reduced in weight. The first reason is that the crawler belt 20 is reinforced with the thin steel belt 21 without being increased in thickness. The second reason is that the belt is engaged with the wheels 10 via the steel belt 21, which eliminates the necessity of forming projections for engaging with the wheels 10 on the belt main body 22.

The crawler belt 20 can be surely prevented from coming off the wheels 10 in a left and right direction since the projections 12a of the wheels 10 fit into the engagement holes 21a of the steel belt 21.

Figure 10:
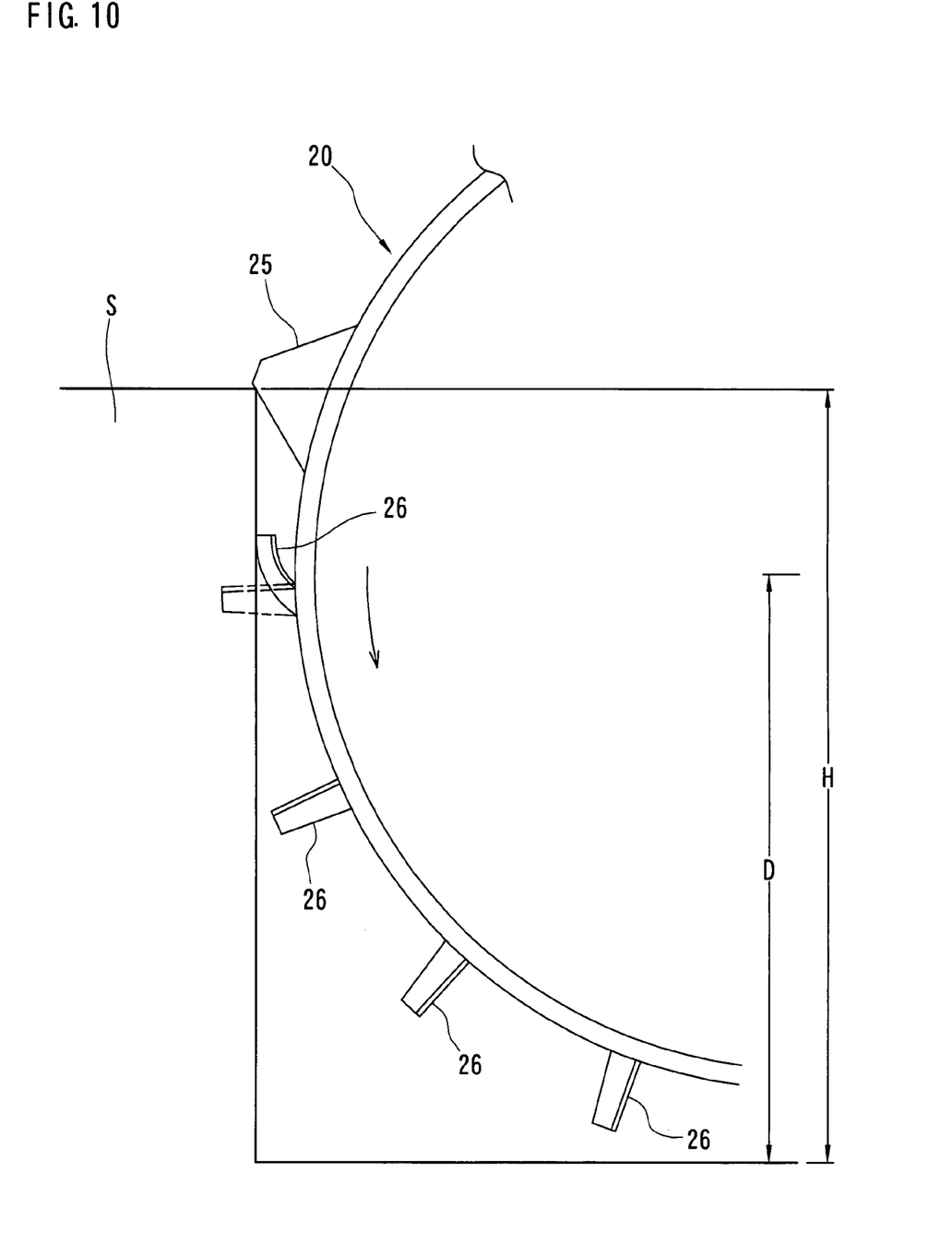
FIG. 10 is a schematic view of the crawler unit as it is riding over a high step.

In this embodiment, as shown in FIG. 10, the robot can move over a step or bump S having a height H greater than a radius D that represents a distance from a center of the wheel 10 to a top end of the tread lug 25, 26. To be more specific, when the robot hits the step S while running and a top end of the second tread lug 26 is abutted against the step S, the second tread lug 26 is subjected to a force acting in a direction opposite to the arrow shown in FIG. 10 and is elastically bent. Then, the second tread lug 26 is subjected to a force acting in a direction opposite to a forward force of the robot and is further greatly bent. Then, with the second tread lug 26 in the bent condition, a top end portion of the first tread lug 25 catches on an upper end of the step S, thereby enabling the robot to move over the high step S.

For the purpose of comparison with this embodiment, let us assume that the second tread lug 26 remains unbent as indicated by the imaginary line shown in FIG. 10 as is the case with prior art crawler belts. In this case, the top end of the second tread lug 26 is abutted against the step S, and thus the crawler units 2L, 2R cannot move closer to the step S. Accordingly, the first tread lug 25 cannot catch on the upper end of the step S. As a result, the robot cannot move over a step having a height greater than the radius D.

Intervals between the tread lugs 25, 26 are wide in FIG. 10, but the same effect can be attained with narrower intervals.

Provision of the two kinds of the tread lugs 25, 26 enables the robot of this embodiment to move over a variety of obstacles.

Figure 11:
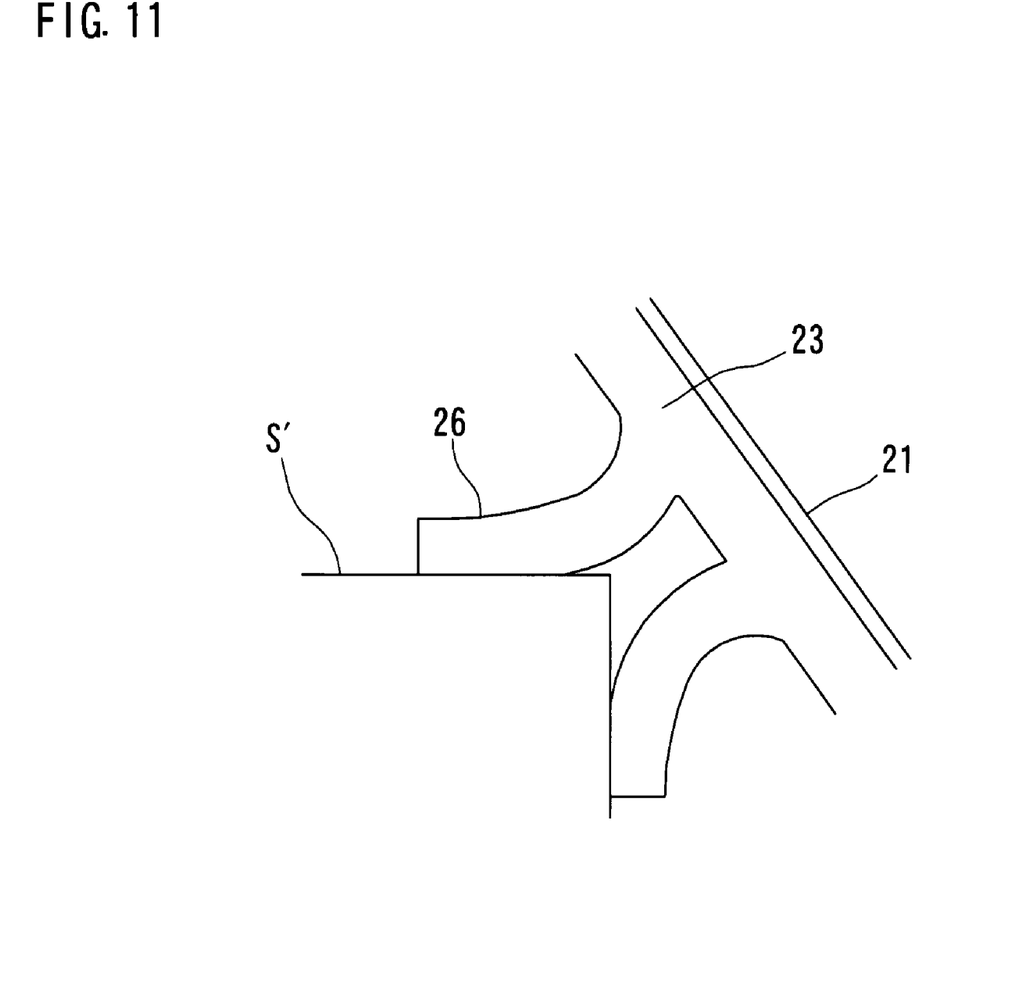
FIG. 11 is a schematic view of second tread lugs of the crawler belt as they are gripping a piece of rubble.

For example, when encountered a relatively low rubble S' having flat surfaces as shown in FIG. 11, the second tread lugs 26 are elastically deformed to increase a contact area with the rubble S'. This allows the second tread lugs 26 to grip the rubble S' well without slipping, thereby preventing the crawler belt 20 from running idle. If intervals between the tread lugs 26 adjoining each other are narrowed, the rubble S' can be gripped more securely with the two adjoining second tread lugs 26 as shown in FIG. 11. This function is very helpful especially when the rubble S' is wet or sands adhere to the rubble S'.

On the other hand, the first tread lug 25 has a limited gripping ability for the rubble S' when the rubble S' is relatively low and sands, etc. are adhered thereto. But the first tread lug 25 has a higher gripping ability than the second tread lug 26 for a pipe and other obstacles with a curved cross-section, and thus can ride over such obstacles easier than the second tread lug 26.

Uniform height of the tread lugs 25, 26 allows the crawler units 2L, 2R to move securely. Although the tread lug 26 is easy to bend, it is strong enough against load in height direction, i.e. the self-weight of the robot, not to be substantially deformed. This allows the robot to keep moving smoothly. The tread lug 26 has a bent planar shape, and therefore has high strength against load in height direction.

In regions of the crawler belt 20 which are placed around the wheels 10 in the front and rear, an edge portion of the shielding flange 24 contacts the end edge portions 31a in the front and rear of the side plate 30. In the other regions of the crawler belt 20 that are placed between the wheels 10 in the front and rear, the edge portion of the shielding flange 24 contacts the raised wall 32a of the seal member 32. As a result, an inner space surrounded by the crawler belt 20 and the pair of side plates 30 is sealed, thereby preventing foreign substances such as water, sands and dust from entering into the inner space.

In the regions of the crawler belt 20 that are placed around half of the periphery of the wheels 10, the crawler belt 20 is bent, and therefore, the edge portion of the shielding flange 24 is warped in a direction away from the end edge portions 31a of the side plate 30. But the edge portion of the shielding flange 24 can contact the end edge portions 31a securely despite the warping because the edge portion of the shielding flange 24 is elastically deformed to contact the end edge portions 31a of the side plate 30 as described above. The shielding flange 24 of the crawler belt 20 contacts the seal member 32 at the upper and lower edge portions of the side plate 30. The seal member 32 is deformed more greatly than the shielding flange 24 because the seal member 32 has smaller elastic coefficient and is thinner than the shielding flange 24. This permits the seal member 32 and the shielding flange 24 to be maintained in contact with each other even when the crawler belt 20 flaps in an area not restrained by the wheels 10 because the seal member 32 is deformed following the flapping of the belt 20. The seal member 32 is coated with Teflon®, etc., which serves to reduce friction between the seal member 32 and the shielding flange 24.

The present invention is not limited to the above embodiment, but various modifications can be made without departing from the scope of the invention. For example, both of the pair of crawler units may be front-wheel drive, rear-wheel drive or two-wheel drive.

Another wheel may be deployed between the wheels in the front and rear. A non-driven wheel may not be engaged with the crawler belt as long as it restricts movements of the crawler belt in the width direction.

The tread lug 26 may have a planar shape of a wave being bent at a plurality of points. The tread lug 26 may not have a trapezoidal longitudinal section but may be formed with a uniform thickness.

Two rows of short helical (double helical) engagement projections slanted in different directions may be formed on the wheel 10 and engagement holes corresponding to the helical engagement projections may be formed in the high-tensile-strength belt so that the crawler belt is surely prevented from meandering.

A chain may be used as the endless elongated member in place of the crawler belt.

The endless elongated member may have a third region in addition to the first and the second regions. In this case, a third tread lug having a different shape from the first and second tread lugs is formed in the third region.

The actuator may not be an electric motor but may be a hydraulic motor or an engine.

Application of the crawler unit according to the present invention is not limited to the rescue robots. It may be applied to other light weight robots such as those used for cleaning hospitals or may be applied to light construction machines other than robots.

When the crawler unit is used for a robot that is hardly required to move on a flat ground, the first tread lug and the second tread lug do not have to be of the same height.

INDUSTRIAL APPLICABILITY

The present invention can be applied to an underbody of a light-weight robot or the like.

The invention claimed is:

1. An endless elongated member for a crawler comprising an endless base part and a multitude of tread lugs arranged on an outer periphery of said base part at intervals in a circumferential direction thereof, said multitude of tread lugs including at least two kinds of tread lugs, first tread lugs and second tread lugs, all of said tread lugs being of the same height, said first tread lugs having high flexural rigidity so as not to be bent when said first tread lugs are subjected to a circumferential force, said second tread lugs being orthogonal to said base part, said second tread lugs having low flexural rigidity so as to be bent when said second tread lugs are subjected to a circumferential force, and said second tread lugs having bent shapes in plan view so as to have high strength against load in height direction.

2. An endless elongated member for a crawler according to claim 1 wherein said endless elongated member includes first regions and second regions alternately arranged in the circumferential direction thereof, each of said first regions having at least one said first tread lug, each of said second regions having at least one said second tread lug.

3. An endless elongated member for a crawler according to claim 2, wherein said first tread lug and said second tread lug extend in a width direction of said endless elongated member and have trapezoidal longitudinal sections, a bottom end of said second tread lug being thinner than that of said first tread lug.

4. An endless elongated member for a crawler according to claim 2, wherein a height of said second tread lug is not less than 3 times and not greater than 7 times as large as its thickness.

5. A crawler unit comprising a plurality of wheels arranged in a front and rear direction and an endless elongated member trained around the wheels, said endless elongated member including an endless base part and a multitude of tread lugs of the same height arranged on an outer periphery of said base part at intervals in a circumferential direction thereof, said endless elongated member having first regions and second regions alternately arranged in the circumferential direction thereof, said multitude of tread lugs of the same height including at least two kinds of tread lugs, first tread lugs and second tread lugs, each of said first regions having at least one said first tread lug, each of said second regions having at least one said second tread lug, said first tread lugs having high flexural rigidity so as not to be bent when said first tread lugs are subjected to a circumferential force, said second tread lugs being orthogonal to said base part, said second tread lugs having low flexural rigidity so as to be bent when said second tread lugs are subjected to a circumferential force, and said second tread lugs having bent shapes in plan view so as to have high strength against load in height direction.

\* \* \* \* \*